United States Patent [19]

Stark, Jr.

[11] Patent Number: 5,495,770
[45] Date of Patent: Mar. 5, 1996

[54] DEVICE FOR MEASURING EXPANSIONS AND COMPRESSIONS

[76] Inventor: Emil Stark, Jr., Komminger Strasse 48, A-6840 Gotzis, Austria

[21] Appl. No.: 99,522

[22] Filed: Jul. 30, 1993

Related U.S. Application Data

[63] Continuation-in-part of Ser. No. 728,136, Jul. 10, 1991, abandoned.

[30] Foreign Application Priority Data

Jul. 19, 1990 [DE] Germany ........................ 40 22 957.2

[51] Int. Cl.[6] .................................................. G01B 7/16
[52] U.S. Cl. ................................... 73/774; 248/206.5
[58] Field of Search ............... 73/774–781; 33/783–790, 33/DIG. 1, DIG. 13; 248/206.5; 269/8

[56] References Cited

U.S. PATENT DOCUMENTS

| | | | |
|---|---|---|---|
| 2,189,775 | 2/1940 | Bleakney | 33/788 |
| 2,198,041 | 4/1940 | Peters | 33/788 |
| 2,416,664 | 2/1947 | Ruge | 33/790 |
| 2,666,262 | 1/1954 | Ruge | 33/788 |
| 2,805,482 | 9/1957 | Schonstedt | 33/788 |
| 2,884,698 | 5/1959 | Wursch | 33/DIG. 1 |
| 4,294,015 | 10/1981 | Drouin et al. | 33/DIG. 13 |
| 4,303,054 | 12/1981 | Lore | 248/206.5 |

FOREIGN PATENT DOCUMENTS

| | | | |
|---|---|---|---|
| 1065043 | 5/1954 | France | 248/206.5 |
| 558232 | 1/1975 | Switzerland | 269/8 |
| 559807 | 5/1977 | U.S.S.R. | 269/8 |
| 889379 | 12/1981 | U.S.S.R. | 269/8 |

*Primary Examiner*—Robert Raevis
*Attorney, Agent, or Firm*—Baker & Daniels

[57] ABSTRACT

A device for measuring expansions, compressions and similar forces on length variable components or machine parts. In order to register even the smallest length variation of components with a transportable device, without having to essentially grip into the component, a housing is provided, in which two knives are arranged lying side by side in spaced apart relation, one of the knives being securely connected with the housing and the other knife being mounted in the housing for movement in the direction fo the length variation of the component to be measured. In the housing a lifting and lowering mechanism is provided, which by lowering the device energizes magnets that are included in the housing which secure the housing magnetically to the component to be measured, whereby the knife edges simultaneously grip into the surface of the component to be measured, and in the raised position of the device, the magnets are nullified and the knife edges are raised from the surface of the member being measured.

9 Claims, 3 Drawing Sheets

DEVICE FOR MEASURING EXPANSIONS AND COMPRESSIONS

This application is a continuation-in-part of my prior and application Ser. No. 07/728,136 filed Jul. 10, 1991, now abandoned.

FIELD OF THE INVENTION AND SUMMARY

The present invention resides in the field of measuring expansions, compressions, forces and distortions in length of variable components, such as machine parts, bridges, ski lift masts, crane girders and crane jibs, trailer bridges for motor cars, street and rail bridges, lines of rails, and other such components, in which a wire strain gauge is used. Various devices have heretofore been known which utilize the wire strain gauge principle. In such use, the length variation of the component to be measured is transferred to a wire strain gauge in the measuring instrument, and the mechanical distortion of the wire strain gauge is converted to an electrical signal which shows the degrees of distortion.

A disadvantage of previously known devices is that applying the device to the component to be measured (test object) is difficult and at least certain ones could be connected with the component only one time as by gluing or other form-fitting bindings.

An object of the invention therefore is to construct such a device that can be removed each time from the test object, and is transportable. A one-time fastening of a wire strain gauge to a component is therefore avoided.

Another object is to so construct such a device that is easily transportable, and in which the smallest length variations of components can be registered and in the use of which the fastening on the component is secure, without the component itself being impaired.

Another object is to provide such a device that is unique, in utilizing magnets for holding the device to the test object, and further in which the magnets are applied in position so that the magnetic force produced thereby is gradually applied, thereby avoiding sudden or jolting contact of the device with the test object.

A further object is to provide such a device that is well adapted to use with bodies having a round, prismatic or other curved surface, and additionally such a device that can be shoved into a pipe.

A further object is to provide such a device having knife disks, the knife disks being rotatably mounted thus resulting in the advantage that when a knife edge is damaged, the knife can be turned to a new position presenting an undamaged edge to the component.

Another advantage of the device is that it includes a novel mounting means mounting wire strain gauges in the device.

Another advantage of the invention is a novel mounting of a knife that engages the test object for movement in the direction of the longitudinal axis of the test object and in so moving it engages and moves over a mechanical dial gauge or over an electronic test key. If desired, it may be provided that it engage and move over a pressure pick-up element functioning according to the Piezo principle, or according to the wire strain gauge principle. Another alternative is utilizing a quartz load cell.

Another advantage is that two stationary points are connected with the surface of the test object in such a way that a practical positive securement between the surface of the test object and the knife is achieved.

The device of the invention has the advantage that the knife disks are sharp and positively grip into the rough interstices of a hardened surface of the test object.

Another advantage is that the device can be made and is found practical in effective lengths of 400 mm or more. In such an arrangement, an accuracy of $1/10000$ mm is achieved.

Another advantage of the invention is the provision of a novel arrangement utilizing a control lever for lifting and lowering the device onto the test object, and the magnet utilized is energized, and de-energized respectively by the movement of the control lever, and with the further advantage that the parts making up the magnetic components are moved in relatively sliding relation to consequently produce energization and de-energization in a gradual manner.

A still further and important feature of the invention is that in a starting position, the magnetic components are de-energized and the knife edges are raised out of contact with the test object, and pursuant to movement of the control lever and consequent energization of the magnetic components, the knife edges are moved gradually into engagement with the surface of the test object, with a force in proportion to the degree of energization of the magnetic components.

A further advantage of the invention is the provision of friction engagement between the measuring device and the test surface. Such friction engagement is established by a novel arrangement, which prevents the device from turning around the knife edge and clinging onto an object such as a shaft that is being measured. It is therefore possible to also measure the dimension variation of the shaft in a lateral direction, without the measuring device swinging around the shaft to be measured.

BRIEF DESCRIPTION OF THE INDIVIDUAL VIEW OF THE DRAWINGS

DETAILED DESCRIPTION

Figure 1:
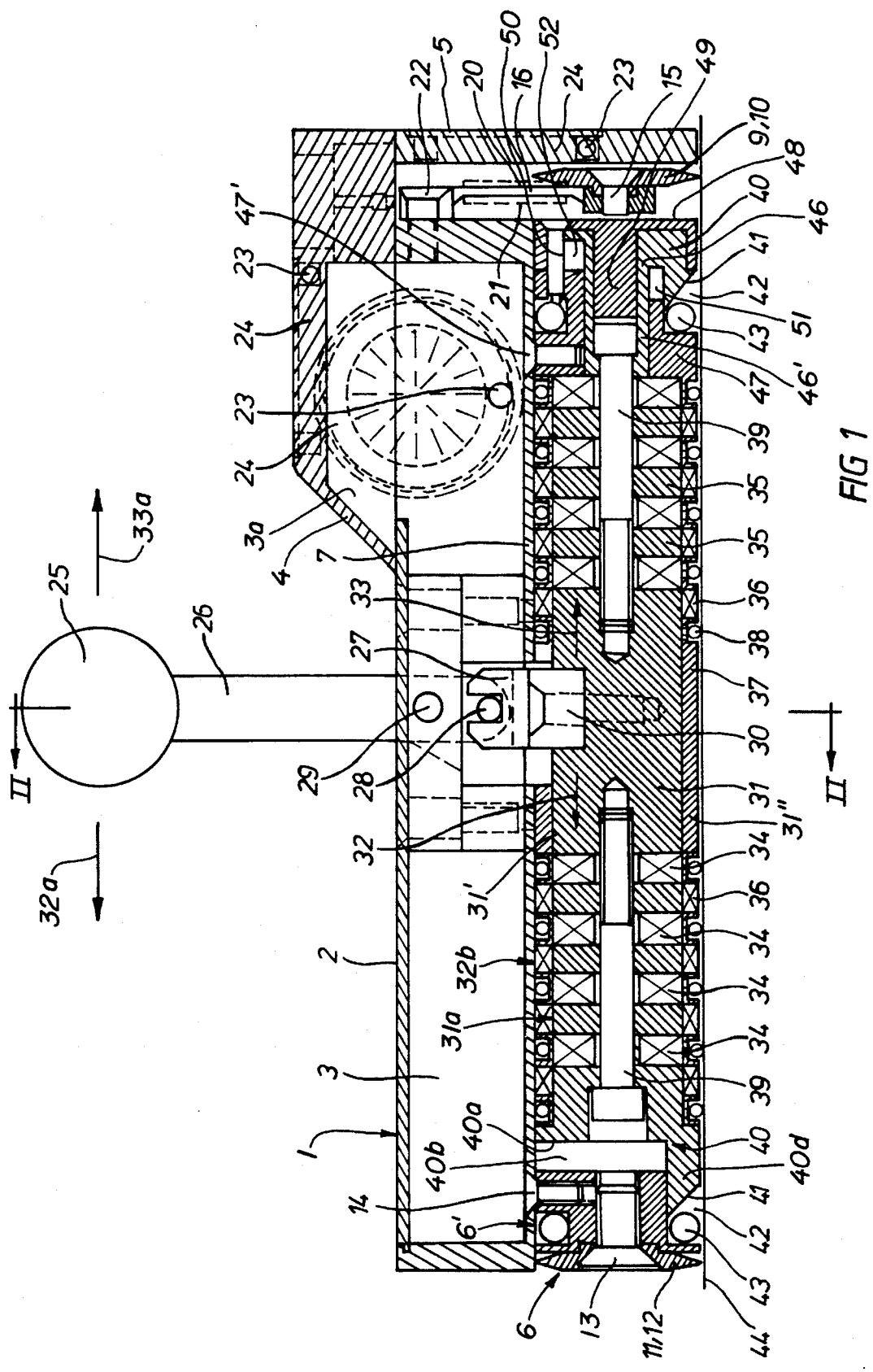
FIG. 1 is a longitudinal sectional view through the measuring device of the invention.

FIG. 1 shows a housing 1 which includes an upper/side cover 2 which covers an electronic component 3 thereunder, in which an electronic plotting switch is arranged. Electronic signals developed from a strain gauge referred to below are transmitted to this electronic component.

Positioned in an opposite part of the housing is a battery compartment 3a having a cover 4, containing batteries for a remote control operation.

On three of the housing walls positioned perpendicular to each other, are tilt meters 24, and incorporated into each tilt meter is measuring sphere 23. Each tilt meter includes a ring shaped circumferential groove, in which the corresponding free-moving measuring sphere is positioned. Instead of the measuring sphere 23, a needle or pointer can be used.

The interior of this groove is provided with a round anchor plate, so that when desired, the position of the measuring sphere in relation to the graduation on the plate can be observed, and thereby the gradient of the device on the test object relative to the gravitational access.

Such a tilt meter is arranged on the front side, according to FIG. 1, in the top element of the battery cover 4 and on the right front side in the region of a protective cover 5.

Lying opposite to the tilt meter 24 that is visible in the front view of FIG. 1 is a further tilt meter arranged on the hidden side wall of the housing.

Figure 2:
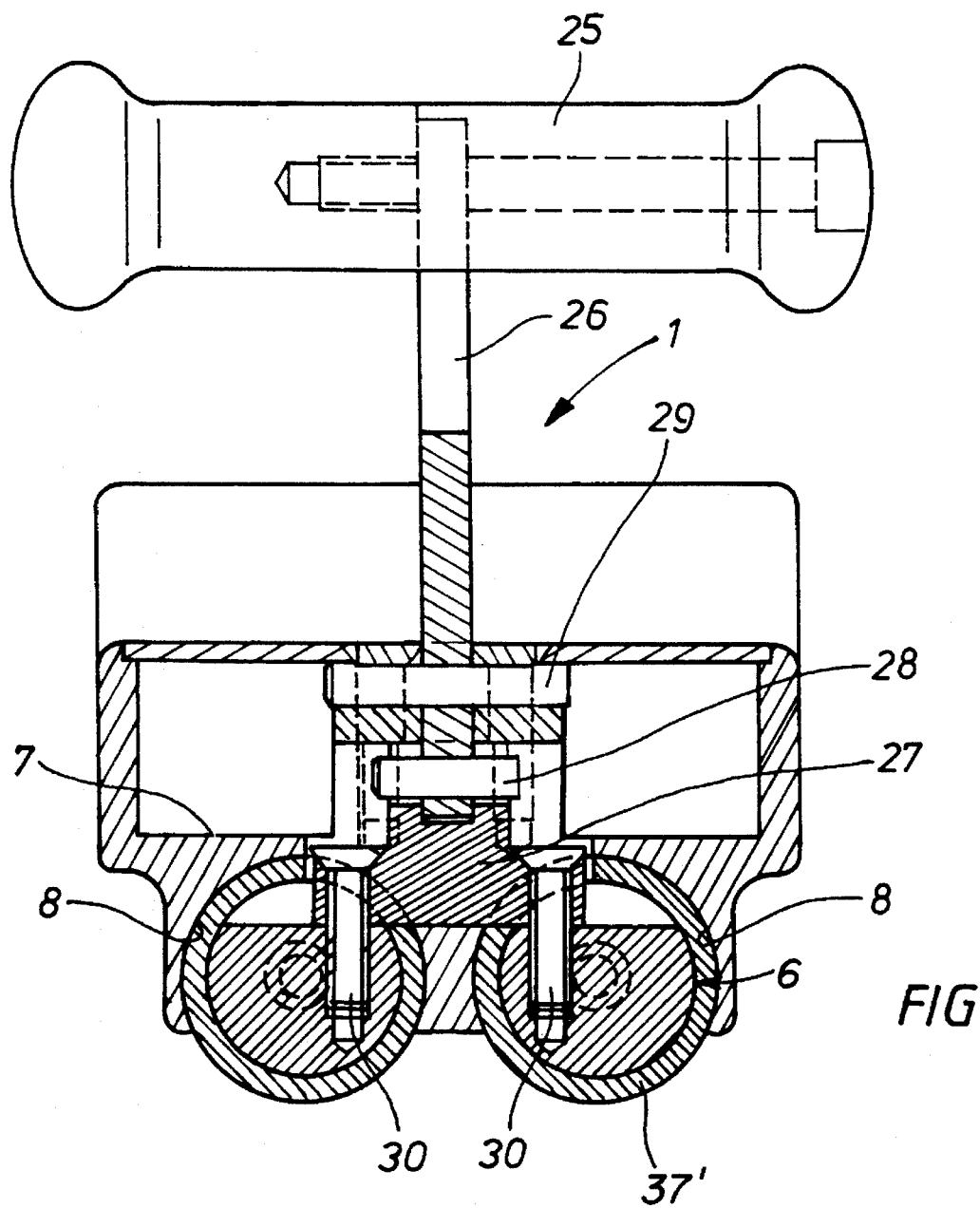
FIG. 2 is a transverse vertical sectional view taken at line II—II in FIG. 1.
Figure 3:
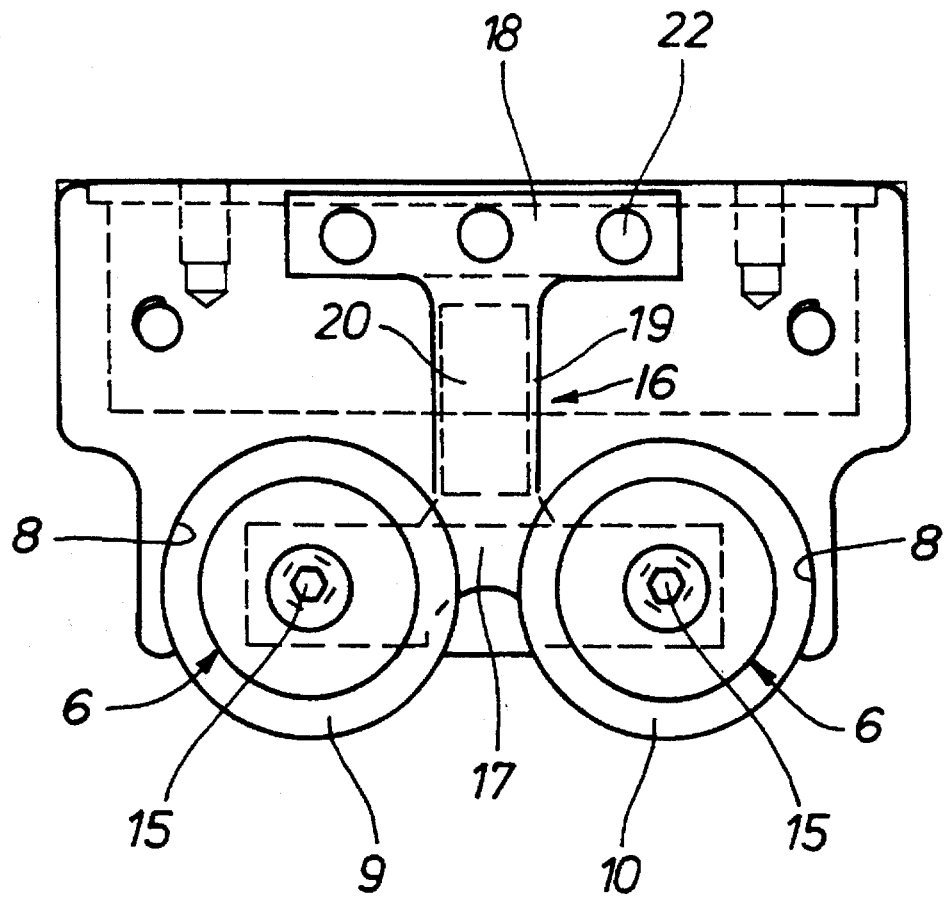
FIG. 3 is an elevational view taken at the right end of FIG. 1.

Attention is directed to FIGS. 2 and 3 which show the lower housing wall 7 of the housing, which forms two semi-circular channels 8, extending longitudinally, in each of which is an insert unit 6. These insert units may be identical, or symmetrical, and the following description refers to one of the units, such as the one exposed in section in FIG. 1 and positioned at the left in FIGS. 2 and 3. For further convenience in identification, the unit 6 here described in detail includes the knife disks 9, 11 at the right hand end and left hand end, respectively of FIG. 1. The other knife disks are designated 10, 12, are at the right hand side of FIGS. 2 and 3, and in the insert unit 6 that is not shown in FIG. 1, but which is in the opposite side thereof.

For further ease in description and identification, it is pointed out that (FIGS. 1, 3,) the two disk knives, 9, 10 are mounted on a measuring arm 16 as will described in detail hereinbelow. Mechanical movement resulting from expansion or contraction of the test object are transmitted to this measuring arm, and mounted on this arm are wire strain gauges 20, 21 which convert the mechanical movement to electronic signals, and a plug-in arrangement is provided for transmitting such electronic signals from the wire strain gauges to the electronic component 3 identified above.

The knife disk 11 (FIG. 1) is connected in a sub-unit 6' by means of a screw 13. The insert unit 6 can be removed from the housing in the direction of the arrow 33 when the protective cover 5 is removed, and it can be inserted thereinto in the opposite direction, indicated by the arrow 32. The insert unit is held in the housing by means of screw 14.

As referred to above, the knife disks 9, 10 are mounted on the mounting arm 16, and attention is directed now, to the details of this mounting.

The measuring arm 16 is an integral H-shape member, and includes a central shank 19 and cross arms 17, 18 at the ends of the central shank. The cross arm 18 is secured to the housing by means of screws 22 and the entire measuring arm is thereby mounted on the housing. The remainder of the measuring arm is free of connection, and flexible, and the knife disks 9, 10 are rotatably mounted on the ends of the cross arm 17, and thus on the free unconnected end of the measuring arm. It is pointed out that the knife disks 9, 10 are movably mounted, on the measuring arm, while the knife disks 11, 12 at the opposite end are fixed relative to the housing. The corresponding knife disks at opposite ends, i.e. left, right ends of FIG. 1, are thus mutually relatively movable for responding to the changes in the test object being measured.

The measuring position of the device is that shown in FIG. 1, which is also the lowered position, where the stationary knife edge 11 sinks into the upper surface of the test object. In this position, the magnets 34 are in position to magnetically hold the device to the test device which is magnetic. This feature will be referred to again in detail hereinbelow. The test object is indicated by the line 44. In a similar manner, the knife disk 9 sinks into the surface of the test object. In corresponding length variations of the test object, the knife disk 9 moves relative to the knife disk 11 in the direction of the arrows 32, 33 and the connecting arm 19 is curved thereby, and the wire strain gauges 20, 21, which are securely attached to the front and rear side of the connecting arm, experience a mechanical curving, whereby their electrical value changes. This electrical alteration is delivered to the evaluation switch, which is incorporated in the electronic component 3 referred to above.

Reference is now made to the raising and lowering mechanism of the device, for applying the device to the test object. This mechanism includes a control lever 25 having an arm 26 swingably mounted in the housing, the arm being mounted by means of a pivot bearing 29. At the free lower end of the lever arm is a pin 28 fitted in a steering head, or fork head, 27 which is securely connected with a sliding part 31, by means of a screw 30. This sliding part 31 is part of the insert unit 6 and is movable in the direction of the arrows 32, 33. The insert unit 6 includes a relatively great number of parts or elements compacted together, and extending as a group substantially throughout the length of the semicircular openings 8, i.e. as viewed from left to right in FIG. 1. This assemblage extends from the extreme left end of the housing, to a position near, but spaced from, the knife disk 9.

The sliding part 31 is made up of non-magnetic material, as for example, brass or aluminum, and consists essentially of a middle part, which is securely fastened with the control lever 25 by means of the screw 30, and is slidingly moved in response to swinging movements of the lever, as referred to again hereinbelow. For convenience, it is stated that the sliding part 31 has an outer diameter 31'. Surrounding the sliding part is a sleeve 31" of non magnetic material, secured to the housing, and thus fixed.

Laterally of the sliding part 31 (FIG. 1), or longitudinally thereof, in each direction, is a plurality of elements. These elements are included in an inner group 31a of the same diameter as the sliding part, and an outer group 32b surrounding the inner group and respectively engaging the sleeve 31" and held thereby against sliding movement. The inner groups are secured to the sliding part 31' and slidable therewith. The elements at the opposite ends, i.e., on opposite sides of the sliding part, are essentially identical or symmetrical.

In the inner group, 31a, at each end, are a plurality of spaced apart magnets 34 (identified above) in the form of plates, parallel to each other. Between adjacent ones of these plates, is a non-magnetic element 35 also in the form of a plate. This assemblage including the plate magnets 34 and the non-magnetic elements 35, together with a lifting element 40, are held together in packet form by means of a screw 39. This packet, or assemblage, has an end surface 40a, at the left end, forming a space 40b between the packet and the sub-unit 6' 40c referred to again hereinbelow. The lifting element 40 has a longitudinal extension 40d with an inclined surface 41 forming a cam, which diminishes in size in direction toward the end of the assemblage, i.e. to the left as viewed in FIG. I. Just beyond this cam 41 is an O-ring 43, positioned in a space 42. This cam 41 engages the O-ring in the detaching step, as explained below.

Longitudinally beyond the lifting element 40, to the left as viewed in FIG. 1, the sub-unit 6' is held fixedly in place by the screw 14. The knife disk 11 is rotatably mounted on this sub-unit and held thereon by the screw 14. The O-ring 43 surrounds this unit 14c.

Contained in the outer group 32b are a series of alternately arranged iron rings 36 and groove elements 36a the grooves of the latter opening radially outwardly. In each groove element 36a is a floating O-ring 38. These elements 36, 36a are held fixedly in position in the housing, as noted above, i.e. they remain fixed relative to the movement of the sliding part 31 by the sleeve 31", and by another element at the right hand end as noted below.

At the other end of the housing, i.e. at the right hand end as viewed in FIG. 1, is an additional element 46 connected in the packet or inner group 31a. This element 46 has a central tubular element or shank 46', and has at its outer end a lifting element 40, similar to that at the opposite end, with a cam 41 engageable with an O-ring 43. Surrounding the shank 46' is a tubular member 47 which is held fixedly in place by a screw 47' extending through the housing member 7. Consequently, the series of elements 34, 35, 38 at each end, and the central sleeve 31" are all held as a longitudinal effectively solid member, and held stationary, and this stationary condition is pointed up in relations to the movement of the central portion of the assembly as indicated by the arrows 32, 33, and referred to above.

Fitted over the lifting element 46 is a cap 48 having an end element engaging the end of the lifting element and a central boss 49 extending into the tubular shank 46'. The end member 48 is held in place by a screw 50 extending longitudinally through it and into the member 47. The cap 48 is thus held fixedly in position longitudinally.

The lifting element 46, being engaged by the adjacent screw 39, is movable longitudinally with the other movable members including the sliding part 31. This movement is accommodated by voids or empty spaces 51, 52. The adjacent O-ring 43 is held in position adjacent the cam 41 and is engaged by the cam simultaneously with a similar action at the opposite end (left hand end) of the device including the O-ring 43 and the cam 41.

Interposed between the adjacent ones of the groove elements 37 are iron rings 36, held in position with those other elements. The iron rings 36 are positioned alternately with the magnets 34 in the position of the device of FIG. 1.

Upon shoving the lever 25 in the direction of the arrow 33a, the sliding part 31 is moved to the left (FIG. 1) in the direction of the arrow 32 by means of the steering head 27. Thus the entire assemblage with all the plate magnets 34, the non-magnetic plates 35, and the lifting elements 40, moves in the direction of the arrow 32. Consequently the plate magnets 34 are moved into registration with the iron rings 36 and are thereby short-circuited and rendered ineffective. The magnetic force for holding the device on the test object is thus nullified. Simultaneously, the respective cams of the lifting elements 40 ride up onto the O-rings 43 disposed in the recesses 42 mentioned above. The O-rings rest on the upper surface of the test object (line 44) and thereby lift the entire measuring device upward. The measuring device is therefore lifted upward from the test object, and the knife disk unit 9, 10 comes out of contact with the outer surface of the test object.

Upon movement of the lever 25 in the opposite direction i.e. in the direction of the arrow 32a, the steps referred to occur in analogous fashion but in opposite succession. Thereby the plate magnets 34 are moved into registration with the groove elements 37, which are of non-magnetic construction, in which grooves the o-rings 38 are floatably positioned.

In this position the plate magnets 34 exercise their great attractive force and thereby an excellent magnetic bond is formed with the surface to be measured. While the foregoing description had mostly to do with one unit, containing knife disks 9, 10, the attractive force occurs simultaneously in connection with the other unit also, containing knife disks 11, 12, and all of the knife disks grip into the surface of the test object (line 44).

Moving the magnets 34 into and out of energized position is of sliding character, i.e. it is gradual, which eliminates shocks and jolting contact.

The O-rings 38 simultaneously frictionally engage the surface of the test object, whereby the measuring device has frictional engagement with this surface and thereby is secured against sliding and especially against swinging movement relative to the surface this being particularly significant in the case of round tests objects.

While the foregoing description is based on the test object being of magnetic nature, the device is adapted to use with non-magnetic test objects also. In the latter case, a tightening strap or strap retainer is placed around the entire device and the test object, holding the device in place, and correspondingly positively locking the knife disks 9, 10 and 11, 12 with the surface of the test object.

The measuring device is highly effective for sensing the smallest length variations, and also has the great advantage of being easy to bring it to the test object, and removed.

As referred to above, the device is also applicable to test objects having hardened surfaces. The knife disks are so highly sharpened that they readily grip into naturally occurring roughness of the test object.

The scope of the invention is such as to include a device having a single set of knife disks, e.g. 9, 11, but two such sets, as shown, is the preferred form.

I claim:

1. Strain gauge device in which a strain gauge used, for measuring expansion, compression,-strength, distortion of length of variable components, including machine parts, bridges, ski lift masts, crane girders and jibs, trailer bridges for motor cars, street and rail bridges, lines of rails, which constitute test objects, comprising:

a housing (1), a pair of spaced apart knives (9, 11) in the housing, one of the knives (11) being fixedly secured to the housing (1) and the other knife (9) being movable in the direction of the length variation of an object to be tested, magnets (34) in the housing, and lifting and lowering means in the housing operable, in response to actuation thereof, selectively for:
   (a) lowering the housing toward the said component and simultaneously therewith energizing the magnets to magnetically secure the housing against the said component and thereby causing the knives to grip into the surface of the said component, and
   (b) lifting the housing and lifting the knives therewith, and simultaneously therewith nullifying the magnets.

2. A device according to claim 1 wherein, the knives (9, 11) are aligned and form a first unit at the front side of the housing, and other knives (10, 12) are provided and form a second unit mounted in the housing in mutually aligned relation, and spaced toward the rear from the first unit.

3. A device according to claim 2 wherein, the device includes an H-shape member having a pair of cross arms and a central shank interconnecting them, one of the cross arms is fixedly secured to the housing, and the remainder of the H-shape member is unconnected and flexible, the knives (9, 10) at one end of the device are mounted on the flexible end of the H-shape member, and wire strain gauges (20, 21) are operably mounted on the central shank.

4. A device according to claim 2 wherein, in the lowering onto a test object, the knives (9, 10, 11, 12) form a positive locking connection at the surface of the test object and thereby in the measuring position, the device is pressed by magnetic force onto the test object.

5. A device according to claim 1, wherein, the lifting and lowering mechanism includes a manually actuated control lever means operable upon actuation thereof for energizing and moving the magnets as stated.

6. A device according to claim 1 wherein, the knives are mounted respectively at the ends of the housing and longitudinally aligned, the magnets are positioned between longitudinally aligned knives, the device includes friction elements (38) engageable with the test object, and in the energized position of the magnets the friction elements are between the magnets and the test object, and the magnets in exerting magnetic attraction on the test object, act through the friction elements, and thereby establish friction engagement between the device and the test object.

7. A device according to claim 6 wherein, at least parts of the lifting and lowering mechanism, and the magnets and friction elements for respective longitudinally aligned knives, are disposed in a longitudinal unit, the device includes a pair of said units, and the housing has a pair of longitudinal channels receiving respective ones of said units.

8. A device according to claim 7 wherein, said unit includes a slidable part (31) to which non-magnetic plates (35) and said magnets are secured in alternate arrangement, iron rings (36) are positioned for nullifying the magnets in response to the magnets being moved longitudinally.

9. A device according to claim 1 wherein, the lifting and lowering means includes means for nullifying the magnets and is operable for moving the nullifying means into and out of nullifying position in a sliding direction.

* * * * *